United States Patent [19]

Borde et al.

[11] Patent Number: 4,793,940

[45] Date of Patent: Dec. 27, 1988

[54] ABSORBENT COMPOSITION FOR REFRIGERATION AND HEATING SYSTEMS

[75] Inventors: Irena Borde; Michael Jelinek, both of Beer Sheva, Israel

[73] Assignee: Ben Gurion Univ. of the Negev Research and Development Authority, Beer Sheva, Israel

[21] Appl. No.: 159,491

[22] Filed: Feb. 11, 1988

Related U.S. Application Data

[63] Continuation-in-part of Ser. No. 23,901, Mar. 10, 1987, abandoned, which is a continuation of Ser. No. 802,192, Nov. 25, 1985, abandoned.

[30] Foreign Application Priority Data

Nov. 28, 1984 [IL] Israel ............................... 73656

[51] Int. Cl.$^4$ .............................................. C09K 5/04
[52] U.S. Cl. ........................................ 252/69; 62/101; 62/109; 62/112; 252/68
[58] Field of Search ............... 252/68, 69; 62/101, 62/109, 112

[56] References Cited

U.S. PATENT DOCUMENTS

| | | | |
|---|---|---|---|
| 4,413,479 | 11/1983 | Rojey | 62/101 |
| 4,418,545 | 12/1983 | Markfort | 62/114 |
| 4,428,854 | 1/1984 | Enjo et al. | 252/69 |
| 4,557,850 | 12/1985 | Ando et al. | 252/69 |

FOREIGN PATENT DOCUMENTS

| | | | |
|---|---|---|---|
| 124079 | 11/1984 | European Pat. Off. | 252/69 |
| 61172 | 4/1983 | Japan | 252/69 |
| 40183 | 3/1985 | Japan | 252/69 |

*Primary Examiner*—Robert A. Wax
*Attorney, Agent, or Firm*—Browdy and Neimark

[57] ABSTRACT

The invention provides a working fluid for an absorption refrigeration, cooling or heating system comprising a mixture of dimethyl formamide and N-methyl-2-pyrrolidone as the absorbent therein.

2 Claims, 2 Drawing Sheets

ABSORBENT COMPOSITION FOR REFRIGERATION AND HEATING SYSTEMS

This application is a continuation-in-part of application Ser. No. 023,901 filed Mar. 10, 1987, now abandoned, which in turn was a continuation of application Ser. No. 802,192 filed Nov. 25, 1985, now abandoned.

The present invention relates to a working fluid for use in absorption refrigeration, cooling or heating systems. More particularly the present invention relates to a novel absorbent composition having improved performance properties.

Absorption refrigeration systems as well as absorption heat pumps and absorption cooling systems including a liquid absorbent which remains in liquid form throughout the operation cycle and a refrigerant having both a liquid form throughout the operation cycle and a refrigerant having both a liquid phase and a vapor phase, wherein the refrigerant is dissolved in the absorbent and, in well known thermodynamic steps, is successively boiled off in a generator, condensed, evaporated and reabsorbed into a weak solution of the absorbent, are well known in the art.

With advancing absorption technology and e.g., the ever increasing demand for air-conditioning and more sophisticated refrigeration machines, there is a continuing need and search for improved working fluids in general, and for improved absorbent materials in particular.

As is known, conventional refrigeration machines have primarily been operated with either ammonia-water or water-lithium bromide solutions.

Ammonia-water refrigeration systems, however, suffer from the following known disadvantages:

(a) Water is a relatively volatile absorbent, therefore, to obtain pure refrigerant vapors for proper operation of the machine, it is necessary to separate vapors by rectification;

(b) Ammonia is a toxic gas. Its use in household applications is consequently prohibited in some countries and limited to very small machines in others;

(c) Ammonia-water is unstable at temperatures above 140° C.

(d) Because of safety limitations, ammonia cannot be used for refrigeration in motorized vehicles, (e) For refrigeration in direct-contact cooling applications e.g., freezing desalination, ammonia cannot be used with water or aqueous solutions (e.g. sea water).

Similarly, water-lithium bromide systems have the following known disadvantages:

(a) Because water is the refrigerant, it is not possible to obtain sub-zero (°C.) temperatures.

(b) Because of crystallization of LiBr from aqueous solutions, operation must be several degrees above 0° C.

(c) Water-LiBr solutions are very viscous, therefore operation of the absorbent in the system is problematic, because of the required energy of pumping.

(d) For direct-contact applications, the same problems exist as mentioned before with regard to ammonia water systems.

To overcome the disadvantages of ammonia-water and water-LiBr solutions, several working fluids have been proposed, such as:

(1) Methanol-LiBr which permits obtaining sub-zero temperatures, but which is unstable above 120° C. Furthermore, the same viscosity problem exists as mentioned above and the refrigerant is both toxic and flammable.

(2) Ammonia-NaSCN solutions, while not requiring rectification, pose the same problems of high viscosity and high costs.

(3) Normal hydrocarbons such as butane as refrigerant, and a higher hydrocarbon as absorbent. However, due to safety hazards and low efficiency, this proposal has equally proven to be impractical.

More recently, the use has been recommended in the literature of commercial halocarbon refrigerants of the Freon family in combination with various absorbents.

Thus, e.g., the following working-fluid pairs with the hereinafter mentioned advantages and disadvantages have been suggested:

(1) R22 (difluorochloromethane) and a dimethyl ether of tetraethylene glycol (E181)—relatively good solubility, no need for rectification and stable at high temperatures, however, suffers from high cost of E181 and high viscosity impaired absorption and increased pressure drops);

(2) R22 and di-butyl phthalate (DBP)—no rectification necessary, however has the disadvantage of relatively poor efficiency, very high viscosity and high cost of DBP;

(3) R22 and dimethyl formamide (DMF)—good solubility (efficiency), low viscosity, low cost of DNF, but relatively low volatility of DMF—makes rectification or at least dephlegmation of vapors necessary.

(4) R22 and mixture of DBP-DMF, the authors expected to overcome the disadvantages of R22-DBP and R22-DMF, and to benefit from the advantages of both. However, what has so far been reported in the literature is merely the thermodynamics of this mixture as a working fluid.

While selecting new working fluids for absorption refrigeration operated by low thermal-potential energy sources, the properties of the pure refrigerant and pure absorbent are important, the properties of their solutions are even more decisive, determining as they do the ability of the systems to provide desirable performance characteristics of the refrigeration machines. Several properties of the working fluids have to be considered, such as their chemical stability, toxicity, corrosivity, and tendency to exhibit negative deviations from Raoult's law.

Although with respect to R22 as the refrigerant of choice most mentioned in the recent literature, the dimethyl ether of tetraethyleneglycol (DMETEG) has so for been considered to be the best absorbent in terms of the overall properties of its solutions as a working fluid in an absorption refrigeration machine, it was nevertheless found desirable to use a cheaper and more extensively used solvent than DMETEG.

Thus, e.g. one finds various suggestions for novel absorbents and working fluids in U.S. Pat. Nos. 4,005,584; 4,042,524; 4,072,027; 4,172,043 and 4,251,382 issued to Allied Chemical Corporation in recent years.

EP-A-No. 0062516 discloses a composition for absorption refrigeration comprising a fluorinated hydrocarbon (refrigerant), an amide or glycol ether (absorbent) and 0.05 to 0.5 weight % of a phosphite (stabiliser).

EP-A-No. 0030127 discloses an absorption refrigerant composition comprising 1,1,1,2-tetrafluoroethane and an organic solvent therefor, e.g. at least one of tetraethylene glycol dimethyl ether, dimethyl formamide and methyl ethyl ketone.

EP-A-No. 0124079 discloses N-methyl pyrrolidone as a solvent and a refrigerant, such as 1.1.1 trifluoroethanol.

After years of research and development, only partially described hereinafter, it has been surprisingly discovered that an unexpected synergistic effect is achieved when dimethyl formamide (DMF) is admixed with N-methyl-2-pyrrolidone (MPL) to form a binary absorbent and accordingly the present invention provides a working fluid for an absorption refrigeration, cooling or heating system comprising mixtures of dimethyl formamide and N-methyl-2-pyrrolidone as the absorbent therein.

Within the framework of the search for a safe, nontoxic refrigerant with high chemical stability for absorption units powered by low-grade heat sources, volatile, hydrogen-containing halogenated aliphatic hydrocarbons were found to be preferable, especially difluoromonochlormethane.

Initially, the search for refrigerant-absorbent pairs was extended to mostly polar absorbents, some of them selected from the group of esters of phosphoric and phosphonic acids. It should be emphasized that this group of absorbents has not been considered for refrigeration applications prior to the present investigation. In selecting the latter, it was expected that their ability to form hydrogen bonds through the oxygen as well as the phosphor atoms could contribute towards a negative deviation from Raoult's law. Furthermore, these materials generally have high boiling points, in the range 200°–400° C.:

Dimethyl methylphosphonate (DMNP): 181° C.
Trimethyl phosphate (TMP): 197° C.
Triethyl phosphate (TEP): 215° C.
Tributyl phosphate (TBP): 289° C.
Tricresyl phosphate (TCP): 410° C.

All these materials are chemically stable. Their stability in prolonged contact with the refrigerant at temperatures up to 120° C. has been tested by comparing their infrared and nuclear magnetic resonance spectra before and after contact. No traces of decomposition could be detected and the spectra in all cases were identical.

All of these compounds are used extensively in industry and are less expensive than DMETEG. The only toxic substance in this group is o-tricresyl phosphate, while the m- and p-derivatives as well as the trialkyl phosphates are practically nontoxic. In addition, these solvents are noncorrosive with respect to metals, although they may plasticize some polymeric materials at high temperatures.

Evaluation of potential combinations of refrigerant-absorbents, including absorbents from the esters of phosphoric and phosphonic acids was carried out on the basis of the considerations stated above. Since there are no data available in the literature on the vapor-liquid equilibria of these combinations (and hence of the enthalpy-concentration diagrams, which are necessary for evaluation of the performance characteristics of absorption-refrigeration installations operating with these combinations), experimental determination of these equilibria was required. With difluorochloromethane (R22) as refrigerant, the vapor-liquid equilibrium relationships were measured over a broad range of pressures, temperatures and concentrations of its solutions with N-methyl-ϵ-caprolactam (MCL), N-methyl-2-pyrrolidone (MPL), triethyl phosphate (TEP), tri-n-butyl phosphate (TBP), trimethyl phosphate (TMP), triallyl phosphate (TAP), 1,3-dichlorobenzene (DCB), hexamethylphosphoric triamide (HMPA) and dimethyl methylphosphonate (DMMP).

Furthermore, the data for the pair R22-dimethyl ether of tetraethylene glycol (DMETEG), was redetermined. Among these, the system R22-DCB exhibited a positive deviation from Raoult's law and hence would not be applicable for absorption refrigeration. The absorbents TAP and HMPA were unstable, so the pairs R22-TAP and R22-HMPA, too, would not be suitable for refrigeration uses.

Among the absorbents investigated were representatives of groups of different chemical nature, N-methyl-2-pyrrolidone (MPL)-boiling point 203° C.; methyl ϵ-caprolactam (MCL)-boiling point 235.8° C., dimethyl methylphosphonate (DMMP)-b.p. 190° C., dimethyl ether of tetraethyleneglycol (DMETEG), b.p. 275.3° C. and dimethyl formamide (DMF), b.p. 153° C.

Combinations of R22 with these absorbents eliminates the safety problems encountered with ammonia-water systems and the crystallization and corrosion problems of water-lithium bromide systems. With the first three absorbents mentioned, no substantial rectification is envisaged. A further advantage of R22 is its low solubility in water, which permits its use in direct-contact heat exchange for cooling and heating purposes, resulting in a reduction of the cost of the absorption unit.

Selection of candidate refrigerant-absorbent pairs for absorption refrigeration and heat pumping is based on cycle analysis, from which the following performance characteristics can be derived: (a) coefficient of performance ($COP_R$), for refrigeration, defined as the ratio of the heat extracted from the evaporator ($Q_E$) to the energy input in the generator ($Q_G$) plus the energy consumed by the solution pump ($W_p$):

$$COP_R = Q_E/(Q_G + W_P) \tag{1}$$

(b) circulation ratio (f), defined as the ratio of mass flow rate of the concentrated solution ($m_s$) to the mass flow rate of the pure refrigerant ($m_r$), $$f = m_s/m_r \tag{2}$$

The aim of the cycle analysis of the absorption system was evaluation of the highest COP and the lowest f obtainable under different generator temperatures and constant temperatures of heat rejection (condensing and absorbing) for various working fluids.

Figure 1:
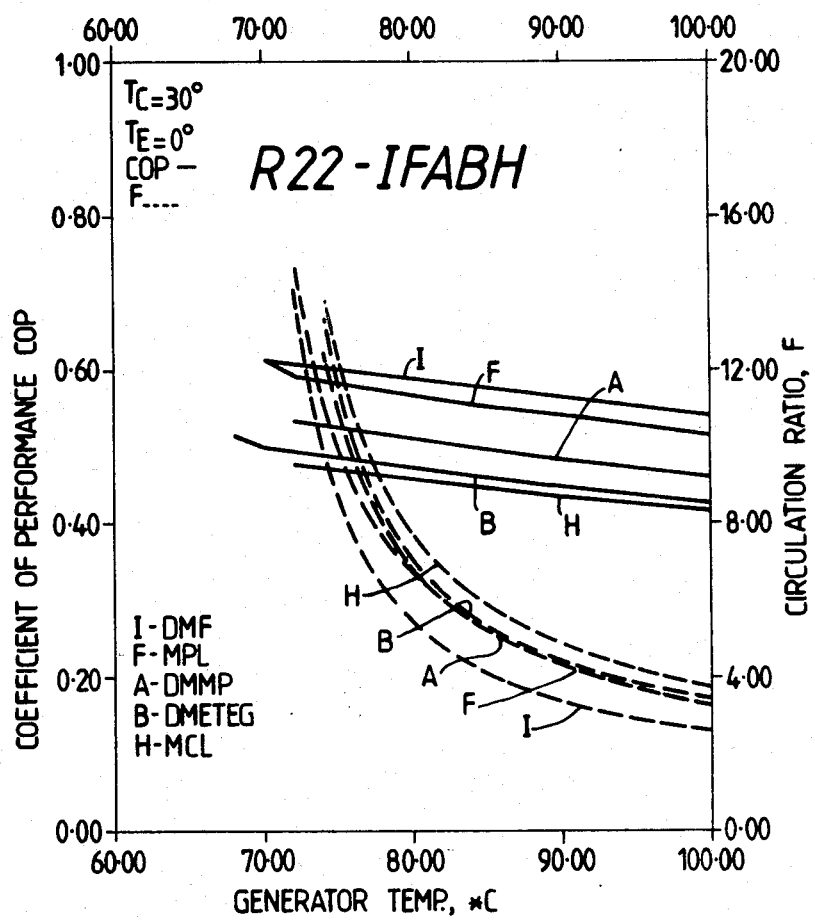
FIG. 1 shows in graphic form performance characteristics and circulation ratios of five refrigerant-absorbent combinations.

For refrigeration and heat pumps, the performance characteristics of the model absorption cycle were evaluated over the following operating conditions: generator temperatures, $60 < T_G < 140°$ C.; evaporator temperatures, $-20 < T_E < 5°$ C. and condenser temperatures, $25 < T_G < 50°$ C. For the combinations R22 with five of the candidate absorbents investigated, namely MPL, DMMP, MCL, DMF and DMETEG, the coefficients of performance and the circulation ratios are presented for refrigeration application, i.e., $T_E=0°$ C., $T_c=30°$ C. The $COP_R$ and f curves in FIG. 1 are similar in form for all refrigerant-absorbent combinations. All $COP_R$ curves have a minimum generating temperature below which operation of the cycle is not possible. The best performance characteristics in terms of $COP_R$ and f are shown by the combination R22-DMF, followed by R22-MPL, R22-DMMP, R22-DMETEG, and finally by R22-MCL. In the higher range of generator temperatures the f curves for R22-DMMP practically merge with those for R22-DMETEG, and the $COP_{HP}$ curves for R22-DMETEG coincide with the R22-MCL curves.

A very important consideration in the design of absorption units is the cost of the heat source and of the circulation pump. If the heat is inexpensive, the system should be designed so as to minimize the circulation ratio at the possible expense of a lower COP, to minimize the cost of the pump.

Since the energy requirements for the desorption process in the generator depend on the absolute value and on the temperature dependence of the excess enthalpy of the solutions, better performance characteristics in terms of $COP_R$ can be expected with the refrigerant-absorbent combinations for which both the absolute value of the excess enthalpy and its temperature dependence are small, as is the case with the combination R22-DMF and R22-MPL compared to the other working pairs studied, which exhibited strong temperature dependence.

The required properties of working pairs have to be derived from the requirements of the specific application and, secondly, from the chosen cycle, the latter being also a function of the chosen working pair.

The cycle analysis has shown that the best performance in terms of COP and f can be achieved with R22-DMF, with DMF exhibiting a chemical affinity towards R22-higher than any other of the investigated absorbents. However, dimethyl formamide has a relatively low boiling point, i.e., 153° C. To avoid the necessity of using a rectifier, the boiling point of the absorber should be at least 200° C. higher than that of the refrigerant and thus even R22-DMF is not a totally satisfactory working fluid.

It was in this context that mixtures of absorbents were tested and that, among the various absorbent mixtures tested, mixtures of MPL and DMF were prepared. It was expected that the performance characteristics, COP and f, of the absorption refrigeration cycle with R22 and the binary absorbent (mixtures of DMF and MPL) would be in between the performance characteristics of R22 with each of the absorbents DMF and MPL, as the physical, thermal and transport properties of mixtures are usually in between the properties of the single component $$COP_{MPL} < COP_{mix} < COP_{DMF}$$

$$f_{MPL} > f_{mix} > f_{DMF}.$$

The vapor liquid equilibrium data for the pair R22 and mixtures of MPL and DMF at five different weight fractions, i.e. MPL/DMF 70/30, 60/40, 50/50, 40/60 and 30/70 were experimentally determined. The data was processed to obtain the enthalpy-concentration diagrams, necessary for evaluation of these new working fluids.

The calculated performance characteristics of the mixtures of R22+DMF+MPL were compared with those of R22+DMF and R22+MPL and are shown in the following Table 1.

TABLE 1

Performance characteristics for R22-MPL, R22-DMF and their mixtures

| w % MPL | 100 | 70 | 60 | 50 | 40 | 30 | 0 |
|---|---|---|---|---|---|---|---|
| w % DMF | 0 | 30 | 40 | 50 | 60 | 70 | 100 |
| COP | .4928 | .5230 | .5200 | .5208 | .5226 | .5283 | .5353 |
| f | 5.396 | 4.191 | 4.128 | 4.074 | 4.1 | 4.03 | 4.582 |
| $m_s$ kg/hr | 375.1 | 291.3 | 287.0 | 283.2 | 285.0 | 280.1 | 318.5 |
| $V_s$ GPM | 1.443 | 1.130 | 1.113 | 1.101 | 1.110 | 1.091 | 1.245 |
| A $m^2$ | 1.466 | .989 | 1.002 | 1.007 | .992 | .975 | 1.389 |
| g | .497 | .479 | .485 | .486 | .489 | .498 | .547 |
| | .590 | .603 | .610 | .612 | .614 | .623 | .646 |
| $T_b^a$ °C. | 203 | 177.5 | 173.5 | 166 | 163 | 160 | 153 |

The comparison was carried out under the following conditions:

Generator temperature: −90° C.
Absorber temperature: −28° C.
Evaporator coil temperature: −3° C.

In table 1, A is the total heat transfer surface ($m^2$) of the inner heat exchangers in the evaporator; $m_s$ is the pump mass flow rate in kg/hr; $V_s$GPM is the volumetric flow rate in gallons per minute; $T_b$ is the boiling temperature of the mixture; $g_a$ are the weight fractions of R22 in the solution at the generator and absorber exit respectively.

The evaluation of the performance characteristics of the pure fluids and mixtures are based on cycle analysis.

Figure 2:
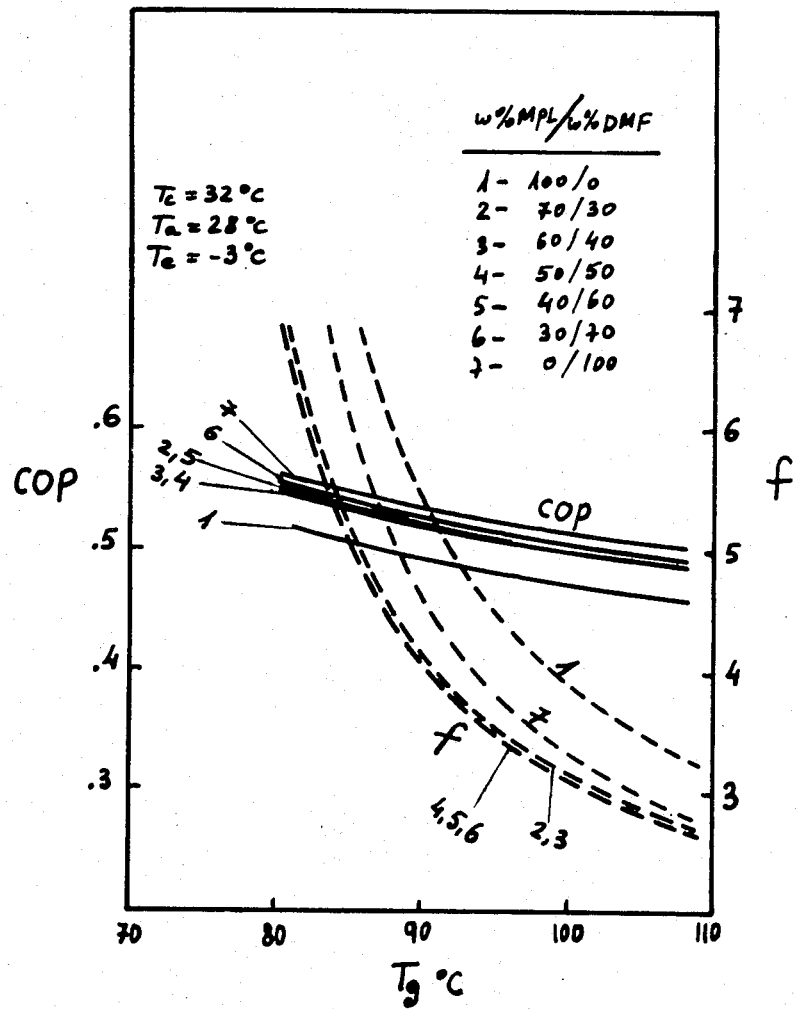
FIG. 2 shows in graphic form the variation of conditions of performance and circulation ratio as a function of the generator temperature for R22 with each of the pure absorbents dimethyl formamide and N-methyl-2-pyrrolidone and for R22 with five mixtures of the two absorbents at different weight fractions.

From the above table and from FIG. 2 in which COP and f as a function of generator temperature are plotted for the various mixtures of R22-MPL-DMF as set forth in table 1, it can be seen that while the COP of R22 with the binary mixture of absorbents is in between those of R22-DMF and R22-MPL the circulation ratio f of the various synergistic mixtures of R22 plus DMF and MPL is appreciably lower than that of DMF which itself is lower than than of MPL. Furthermore, the total heat transfer area of inner heat exchangers for 1 kg/hr of refrigeration in the evaporator is also surprisingly lower than that of MPL or DMF alone. The mass flow rate of the solutions is lower than that of R22-DMF. This allows use of a smaller solution pump.

In addition, as shown in table 1 the new mixtures of R22+DMF+MPL have boiling points in the range of 160° to 177.5° C. which is 7-24.5C higher than that of R22+DMF alone so that depending on the ratio of the components and the characteristics of the other equipment used, a rectifier will be unnecessary in most instances. Furthermore, the performance characteristics and the total area of heat transfer of the refrigeration unit is closer to that of R22+DMF while the mass flow rate is lower than that for R22+DMF.

The above-mentioned indicators are significant for the evaluation of the economic feasibility of the refrigeration unit. The total area of heat transfer and the size of the solution pump are indicative of the investment costs for the refrigeration system and affect the operating costs through capital charges. The general requirement is a reduction of the equipment costs and of power consumption for pumping.

Thus in preferred embodiments of the present invention there is provided a working fluid for an absorption refrigeratin cooling or heating system comprising a mixture of about 30 to 70 DMF w/w% and about 70 to 30 w/w% MPL as the absorbent therein, and difluoromonochloromethane (R22) as refrigerant.

In an especially preferred embodiment of the present invention, there is provided a working fluid for an absorption refrigeration cooling or heating system comprising a mixture of about 40 to 60 w/w% DMF and about 60 to 40 w/w% MPL as the absorbent therein, and difluoromonochloromethane (R22) as refrigerant.

As can be seen from the above table the most preferred embodiment of the present invention is a working fluid comprising a mixture of substantially equal amounts of dimethyl foramide and N-methyl-2-pyrrolidone as the absorbent therein, and difluoromonochloromethane as refrigerant.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A working fluid for an absorption refrigeration system comprising a mixture of about 30–70 w/w% dimethyl formamide and about 70–30 w/w% N-methyl-2-pyrrolidone as the absorbent therein, and difluoromonochloromethane as refrigerant.

2. A working fluid for an absorption refrigeration cooling or heating system comprising a mixture of about 40–60 w/w% dimethyl formamide and about 60–40 w/w% N-methyl-2-pyrrolidone as the absorbent therein, and difluoromonochloromethane as refrigerant.

* * * * *